July 3, 1923.

E. S. CALENO

EXPLOSIVE ENGINE ATTACHMENT FOR BICYCLES

Filed May 27, 1921

1,460,811

INVENTOR,
Ernest S. Caleno,
BY Howard S. Smith
ATTORNEY.

Patented July 3, 1923.

1,460,811

UNITED STATES PATENT OFFICE.

ERNEST S. CALENO, OF DAYTON, OHIO.

EXPLOSIVE-ENGINE ATTACHMENT FOR BICYCLES.

Application filed May 27, 1921. Serial No. 473,074.

*To all whom it may concern:*

Be it known that I, ERNEST S. CALENO, a subject of the King of England, residing at Dayton, in the county of Montgomery, State of Ohio, have invented certain new and useful Improvements in Explosive-Engine Attachments for Bicycles, of which the following is a specification.

The principal object of my invention is to provide light weight and economical means for attaching a motor to a standard bicycle. These means necessitate no alterations in the latter, and they may be readily secured to the bicycle by a screw driver and other bicycle tools.

Other important and incidental objects will be brought out in the following specification, and particularly set forth in the subjoined claims.

Figure 1:
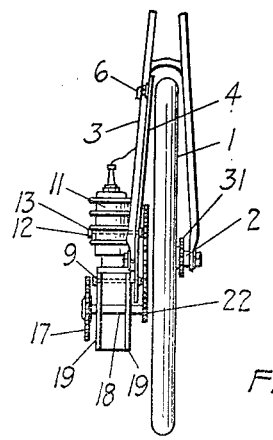
Figure 2:
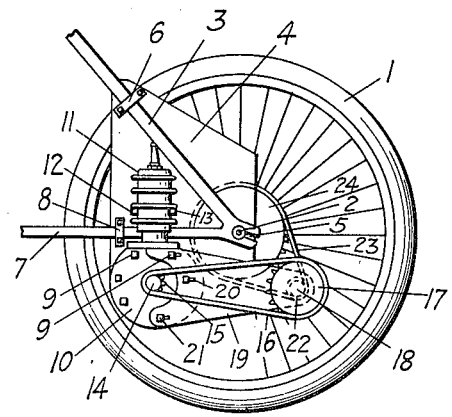
Figure 3:
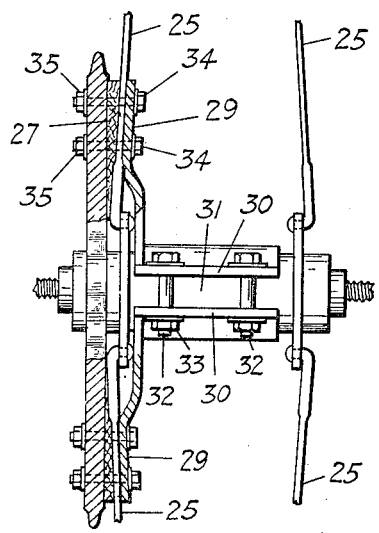
Figure 4:
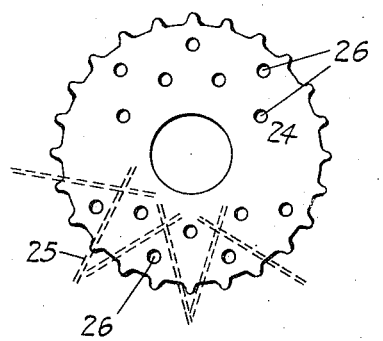
Figure 5:
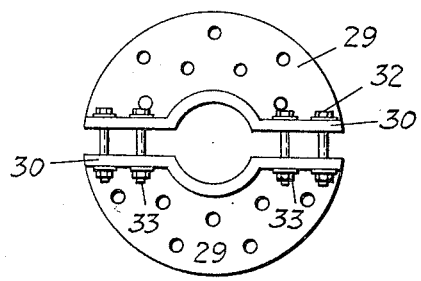

In the accompanying drawings, Figure 1 is an end view of a bicycle to which a motor is detachably secured by my improved attaching means. Figure 2 is a side view of the rear end of a bicycle showing how a motor is secured thereto by my improved attaching means. Figure 3 is an end view, partly in section, of the means for attaching the sprocket to the hub. Figure 4 is a side view of the sprocket, showing how it is attached to the spokes of the rear wheel of the bicycle. And Figure 5 is a side view of the semi-disc clamping means for more firmly securing the sprocket to the rear wheel of the bicycle.

Throughout the specification and drawings, similar reference characters denote corresponding parts.

In a detailed description of the preferred form of embodiment of my invention, the numeral 1 designates the rear wheel of a bicycle, that is mounted on a spindle 2 upon which rests, in the usual manner, the rear fork 3 of the bicycle.

Between the wheel 1 and one side of the fork 3, a motor supporting plate 4 is secured to the bicycle in the following manner. This plate is shaped to follow the outline of the rear bicycle frame in a general manner, being provided in its rear end with a horizontal recess 5 that loosely fits the spindle 2 to allow a lateral movement of the plate for a purpose to be hereinafter described. The top portion of the plate 4 is secured to its respective leg of the fork 3 by a clamp 6, while the lower portion of the plate is secured to the horizontal tube 7 of the bicycle frame by a clamp 8. (See Figures 1 and 2.)

Secured to the plate 4 by bolts 9, 9, is the crank case 10 of a standard single-cylinder explosive engine, the cylinder 11 of which is provided with bosses 12, 12 through which bolts 13, 13 are passed to firmly secure it to said plate. (See Figures 1 and 2.)

Projecting through the crank case 10 is one end of a crank shaft 14 to which is firmly secured a sprocket 15 that transmits power through a chain 16 to a larger sprocket 17. The latter is mounted on a shaft 18 journaled in the rear ends of a pair of tapering supporting plates 19, 19 that contain in their front ends longitudinal slots 20. Bolts 21 are passed through said slots into the crank case 10 to secure the plates 19, 19 to the latter as well as to permit a longitudinal adjustment of them to take up any slack in the sprocket chain 16. (See Figures 1 and 2.)

Fast on the inner end of the shaft 18 is a small sprocket 22 which transmits power through a chain 23 to a large sprocket 24 which is secured to the spokes 25 of the wheel 1 in the following manner. Referring to Figures 3, 4 and 5, the sprocket 24 contains a plurality of bolt holes 26 circumferentially disposed in a manner to clear the interlaced spokes. A yielding annular gasket 27 is placed between the spokes and the apertured portion of the sprocket 24, while on the inside of said spokes there are two semi-circular plates 29, 29. Each of the latter has a flange portion 30 which is concaved at its middle to fit the hub 31 of the wheel 1, said flange portions 30 being secured to each other by bolts 32 and nuts 33 which also serve to tightly secure said plates 29, 29 to the hub of the wheel. (See Figures 3 and 5.)

For the purpose of firmly securing the sprocket 24 to the wheel 1, bolts 34 are passed through the holes 26 in said sprocket, and also through holes in the gasket 27 and semi-circular plates 29, 29 between the spokes 25. By means of nuts 35 applied to the bolts 34, the sprocket 24 is tightly pressed against the gasket 27, thereby forming a solid unit with the spokes 25 and plates 29, 29, to turn the wheel 1.

It is thus seen that I have provided simple and efficient means for readily attaching a motor unit to a bicycle. While these means firmly secure the motor to the bicycle frame, they are sufficiently flexible to take up strains and stresses, and are also adjustable to take up slack in the sprocket chains.

I do not wish to be limited to the details of construction and arrangement herein shown and described, and any changes or modifications may be made therein within the scope of the subjoined claims.

Having described my invention, I claim:

1. The combination with a bicycle, of an explosive engine for propelling the latter, a plate following in general the outline of the rear frame of said bicycle, for supporting said engine, and clamps for detachably securing said plate to said frame, said plate having a horizontal recess in its rear portion to fit over the rear spindle of said bicycle, for the purpose specified.

2. The combination with a bicycle, of an explosive engine detachably secured thereto, a crank shaft propelled by said engine, a sprocket on said shaft, a rear sprocket, a shaft on which the latter is mounted, a sprocket chain transmitting power from the front to the rear sprocket, and a pair of longitudinally adjustable side plates secured to the bicycle, in which the rear sprocket shaft is journaled, for the purpose specified.

In testimony whereof I have hereunto set my hand this 26th day of May, 1921.

ERNEST S. CALENO.

Witness:
HOWARD S. SMITH.